(12) United States Patent
Souchard

(10) Patent No.: US 10,623,453 B2
(45) Date of Patent: Apr. 14, 2020

(54) SYSTEM AND METHOD FOR DEVICE SYNCHRONIZATION IN AUGMENTED REALITY

(71) Applicant: Unity IPR ApS, Copenhagen K (DK)

(72) Inventor: Christophe Souchard, Marina Del Rey, CA (US)

(73) Assignee: Unity IPR ApS, Copenhagen K (DK)

(*) Notice: Subject to any disclaimer, the term of this patent is extended or adjusted under 35 U.S.C. 154(b) by 0 days.

(21) Appl. No.: 16/045,628

(22) Filed: Jul. 25, 2018

(65) Prior Publication Data

US 2019/0036990 A1   Jan. 31, 2019

Related U.S. Application Data

(60) Provisional application No. 62/536,840, filed on Jul. 25, 2017.

(51) Int. Cl.
| | |
|---|---|
| *G06T 19/00* | (2011.01) |
| *G02B 27/01* | (2006.01) |
| *H04L 29/06* | (2006.01) |
| *H04M 1/725* | (2006.01) |
| *G06T 7/33* | (2017.01) |

(52) U.S. Cl.
CPC ........ *H04L 65/4015* (2013.01); *G02B 27/017* (2013.01); *G06T 7/33* (2017.01); *G06T 19/006* (2013.01); *H04M 1/7253* (2013.01); *G02B 2027/014* (2013.01); *G02B 2027/0138* (2013.01); *G02B 2027/0187* (2013.01)

(58) Field of Classification Search
CPC ........................................ G06F 1/163
See application file for complete search history.

(56) References Cited

U.S. PATENT DOCUMENTS

| | | | |
|---|---|---|---|
| 8,400,548 B2* | 3/2013 | Bilbrey | G06F 1/1694 |
| | | | 348/333.01 |
| 8,948,487 B2* | 2/2015 | Sundar | G06T 3/0068 |
| | | | 382/132 |
| 9,406,171 B2* | 8/2016 | Broaddus | G06T 19/006 |
| 9,761,055 B2* | 9/2017 | Miller | G06F 3/011 |
| 9,939,911 B2* | 4/2018 | Mandella | G01B 21/04 |
| 9,959,644 B2* | 5/2018 | Monney | G06T 11/60 |
| 9,971,826 B1* | 5/2018 | Belmar | G06F 9/544 |
| 10,015,370 B2* | 7/2018 | Tseng | H04N 5/04 |

(Continued)

*Primary Examiner* — Paulos M Natnael
(74) *Attorney, Agent, or Firm* — Schwegman Lundberg & Woessner, P.A.

(57) ABSTRACT

A method of registering multiple devices to a single coordinate system is disclosed. A digital video is received from a digital camera device. The digital video presents a 2D view of a three-dimensional environment surrounding the mobile device. A set of simulated images is generated based on each video frame in the digital video. The simulated images and video frame are analyzed to determine features and create scale and orientation invariant descriptors that include depth information for the features. The descriptors and other data are sent to the server over a network. The descriptors are matched to feature descriptors from a second mobile device. A registration matrix is determined that represents a transformation from a coordinate system in the mobile device to a coordinate system in the second mobile device. The registration matrix is stored on the server to perform the registering of the multiple devices.

19 Claims, 10 Drawing Sheets

(56) References Cited

U.S. PATENT DOCUMENTS

| | | | |
|---|---|---|---|
| 2004/0189675 A1* | 9/2004 | Pretlove | B25J 9/1656 |
| | | | 345/633 |
| 2008/0008401 A1* | 1/2008 | Zhu | G06F 19/321 |
| | | | 382/294 |
| 2012/0327187 A1* | 12/2012 | Troy | G01N 29/0654 |
| | | | 348/46 |
| 2013/0094745 A1* | 4/2013 | Sundar | G06T 3/0068 |
| | | | 382/132 |
| 2013/0311868 A1* | 11/2013 | Monney | G06T 11/60 |
| | | | 715/230 |
| 2016/0000518 A1* | 1/2016 | Thoranaghatte | G06F 3/017 |
| | | | 703/11 |
| 2016/0133230 A1* | 5/2016 | Daniels | G06T 19/006 |
| | | | 345/633 |
| 2017/0243403 A1* | 8/2017 | Daniels | G06F 3/147 |
| 2017/0294044 A1* | 10/2017 | Yerli | H04N 21/4302 |
| 2017/0353658 A1* | 12/2017 | Colin | H04N 5/23238 |
| 2018/0084362 A1* | 3/2018 | Zhang | H04R 3/00 |
| 2018/0231771 A1* | 8/2018 | Schuck, III | G02B 27/0018 |
| 2019/0066387 A1* | 2/2019 | Grossmann | G06T 19/20 |

\* cited by examiner

SYSTEM AND METHOD FOR DEVICE SYNCHRONIZATION IN AUGMENTED REALITY

CROSS REFERENCE TO RELATED APPLICATIONS

This application claims the benefit of U.S. Provisional Application No. 62/536,840, filed Jul. 25, 2017, entitled "System and Method for Device Synchronization in Augmented Reality," which is incorporated by reference herein in its entirety.

TECHNICAL FIELD

The subject matter disclosed herein generally relates to the technical field of computer systems and, more specifically, to computer systems and methods for registering and synchronizing multiple devices within an augmented reality environment.

BACKGROUND

The technology in and around virtual reality (VR) and augmented reality (AR) is growing and maturing quickly. VR and AR are experienced primarily by wearing a head mounted display (HMD), and optionally hand tracking and input devices. With AR, for example, the HMD may be configured to integrate virtual objects in conjunction with a real world environment surrounding the wearer. Some known AR systems also include software tools for providing information about the environment to the wearer via the HMD.

Many of the experiences delivered in AR with these devices are mostly individual experiences for the user whereby the user is on their own. There is a need for more socially interactive AR experiences wherein multiple users experience the same AR experience. Typically, for multiple users to participate in the same AR experience, they must all be using the same type of device so that they can communicate with each other and synchronize information, such as their positions with respect to the AR content. An important part of having multiple users participate in the same experience is synchronization of information. For example, the devices may need to communicate their position and interaction with the common AR content. What is needed are systems and methods for multiple users to participate in the same AR experience while using dissimilar devices without predefined visual targets.

BRIEF DESCRIPTION OF THE DRAWINGS

Various ones of the appended drawings merely illustrate example embodiments of the present disclosure and cannot be considered as limiting its scope, and in which.

The headings provided herein are merely for convenience and do not necessarily affect the scope or meaning of the terms used. Like numbers in the Figures indicate like components.

In the description below, the term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

DETAILED DESCRIPTION

The description that follows describes systems, methods, techniques, instruction sequences, and computing machine program products that constitute illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

A synchronization system and associated methods are described herein for allowing AR devices of disparate types (e.g., different manufacturers, models) to register and synchronize with a common AR experience. In an example embodiment, a synchronization engine allows multiple dissimilar devices to register and synchronize absent known visual targets.

In example embodiments, a method of registering multiple devices to a single coordinate system is disclosed. A digital video is received from a digital camera device. The digital video presents a 2D view of a three-dimensional environment surrounding the mobile device. A set of simulated images is generated based on each video frame in the digital video. The simulated images and video frame are analyzed to determine features and create scale and orientation invariant descriptors that include depth information for the features. The descriptors and other data are sent to the server over a network. The descriptors are matched to feature descriptors from a second mobile device. A registration matrix is determined that represents a transformation from a coordinate system in the mobile device to a coordinate system in the second mobile device. The registration matrix is stored on the server to perform the registering of the multiple devices.

Figure 1:
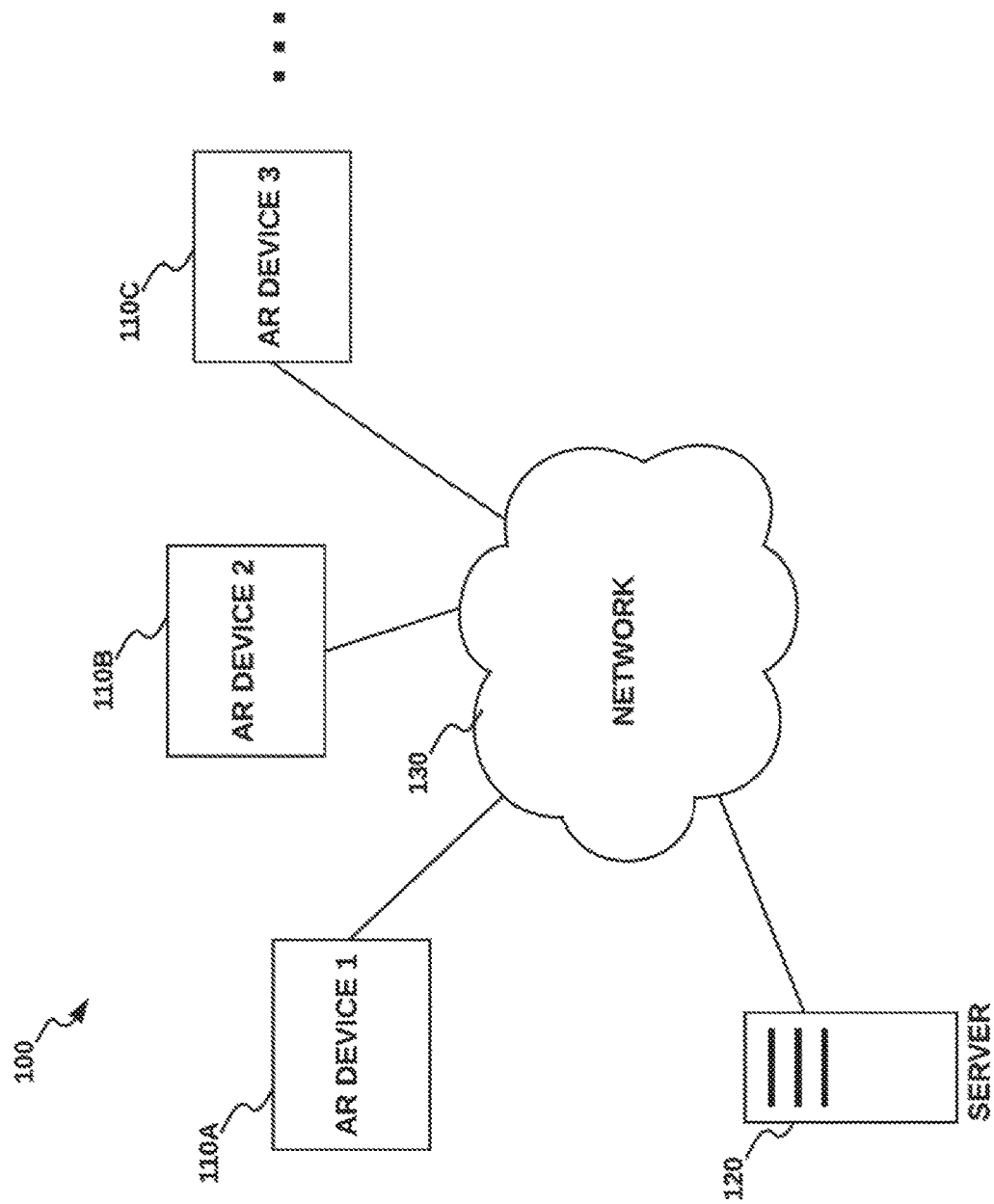
FIG. 1 is a diagram of a synchronization system for registering multiple devices in an augmented reality environment.

FIG. 1 is a diagram of a synchronization system 100 for registering multiple devices 110 in an augmented reality environment. The synchronization system 100 is referred to herein as a multiple device augmented reality system 100 or MDAR registration system 100 for convenience. In the example embodiment, a server device 120 and three AR devices 110A, 110B, 110C (collectively, AR devices 110) are shown as an example, but any number of devices 110, 120 may be used. The AR devices 110 are connected to the server 120 via a network 130 (e.g., a cellular network, a Wi-Fi network, the Internet).

In the example embodiment, each of the AR devices 110 is configured to display AR content to a user (not shown). The AR devices 110 may include, for example, a mobile phone, a mobile tablet, or head-mounted display (MID). For example, the mobile device could be a dedicated AR mobile device or a generic mobile device running Google's Tango™ augmented reality computing platform and is thus capable of displaying AR content. As another example, the HMD may include augmented reality systems such as Microsoft's Hololens™ or Magic Leap's™ HMD or Meta.'s™ HMD.

Figure 2:
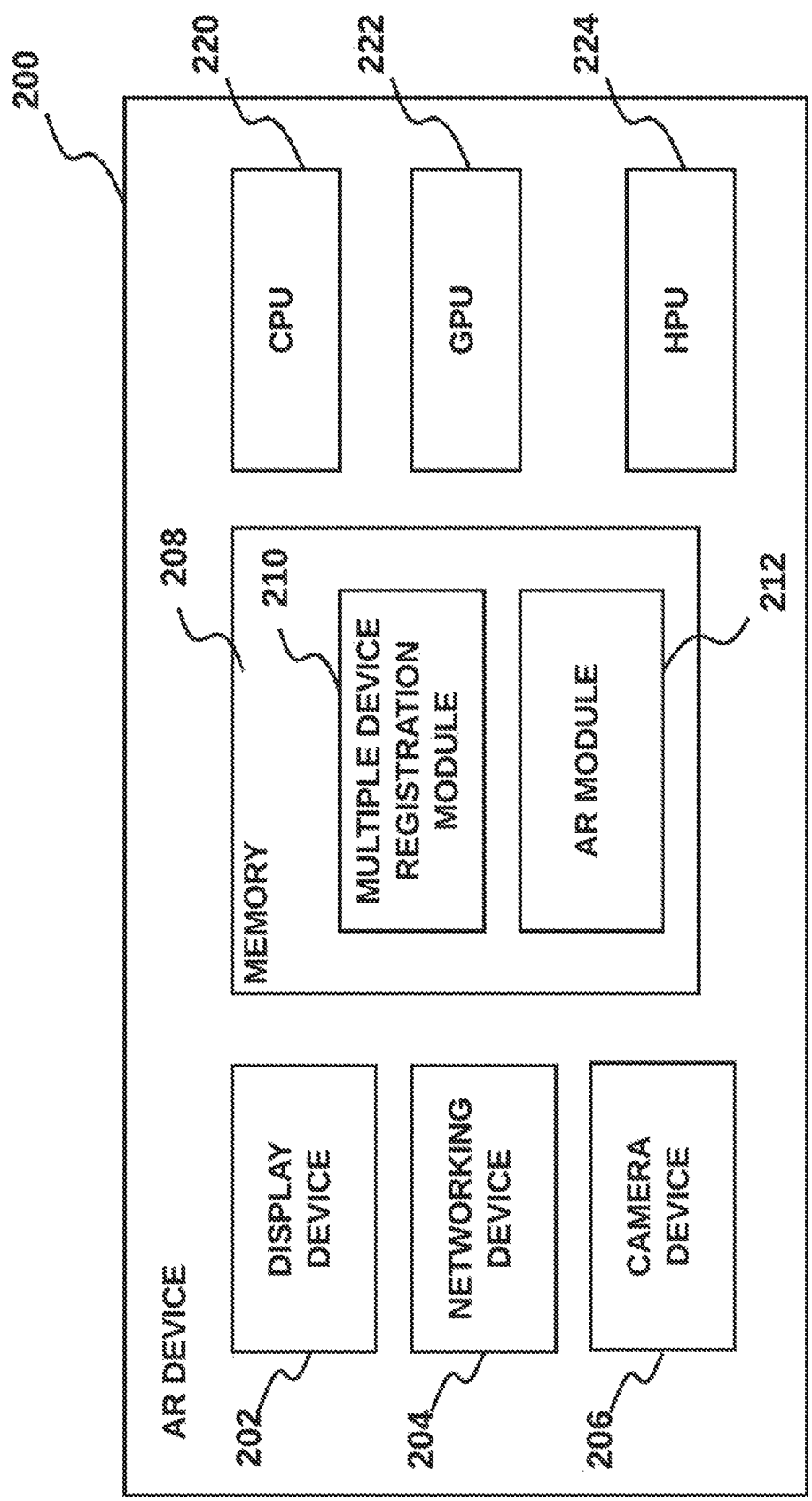
FIG. 2 is a schematic diagram of an example AR device within the MDAR registration system.

FIG. 2 is a schematic diagram of an example AR device 200 within the MDAR registration system 100. In some embodiments, the AR device 200 may be similar to the AR devices 110 shown in FIG. 1. In the example embodiment, the AR device 200 includes a display device 202 that displays rendered graphics (e.g., virtual objects) and possibly video onto a display for the user. The display device 202 is driven or controlled by one or more GPUs 222 or a specific augmented reality GPU such as Microsoft's™ holographic projection units (HPUs 224). The GPU 222 processes aspects of graphical output.

In the example embodiment, the AR device 200 also includes a central processor (CPU) 220 that may execute some of the operations and methods described herein. The AR device 200 also includes wired or wireless network devices 204 (e.g., Wi-Fi, Bluetooth, cellular) that facilitate communication between the AR device and other computing devices described herein (e.g. other AR devices and a server device). The AR device 200 includes a memory 208 that includes a multiple device registration module 210 that may execute some of the operations and methods described herein. The memory 208 also includes an AR module 212 that may execute some of the operations and methods described herein. The multiple device registration module 210 may be implemented within the AR module 212 or as a separate module (e.g., as shown in FIG. 2).

In the example embodiment, the AR device 200 also includes a camera device 206 configured to capture video of the AR device 200's surroundings (e.g., the "real world" environment). The camera may be a digital color camera (e.g., a red-green-blue (RGB) camera), and may be a camera that includes depth information (e.g., RGB-depth or RGB-D camera). Throughout the description herein, the term RGB camera will refer to a standard digital color camera device (e.g., a non-depth sensing camera) and RGB-D will refer to a camera device that includes depth information. The multiple device registration module 210 and AR module 212 include computer-executable instructions residing in the memory 208 that are executed by the CPU 220 and optionally with the GPU 222 during Operation.

Figure 3:
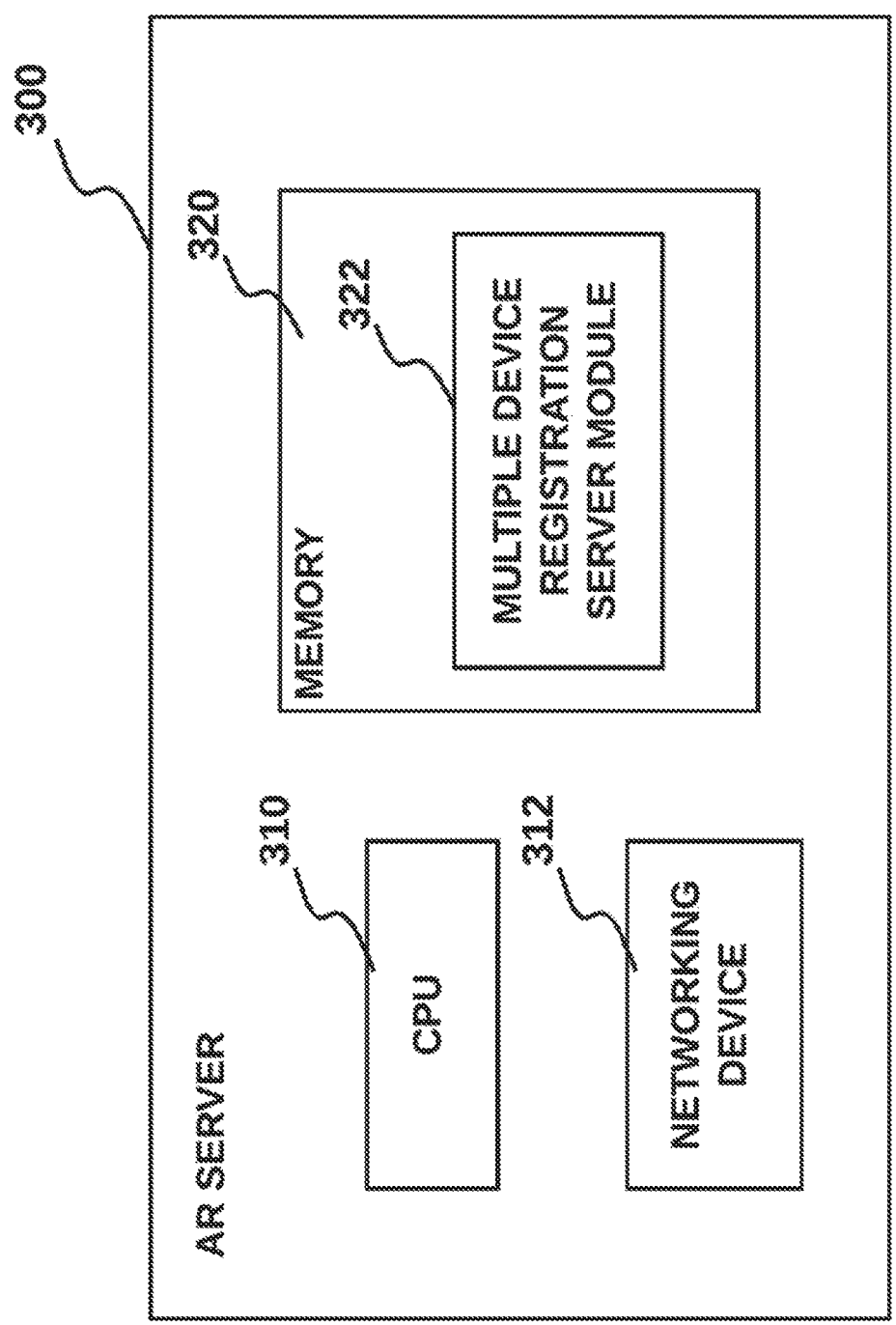
FIG. 3 is a schematic diagram of an AR server within the MDAR registration system.

FIG. 3 is a schematic diagram of an AR server 300 within the MDAR registration system 100. In some embodiments, the AR server 300 may be similar to the server 120 shown in FIG. 1. In the example embodiment, the AR server 300 includes a CPU 310 that may execute some of the operations and methods described herein. The AR server 300 also includes wired or wireless network devices 312 (e.g., Wi-Fi, Bluetooth, cellular) that facilitate communication between the AR server 300 and other computing devices described herein (e.g. other AR servers 300 and AR devices 200). The AR server 300 includes a memory 320 that includes a multiple device registration server module 322 that may execute some of the operations and methods described herein.

Referring now to FIGS. 1-3, during operation, in the example embodiment, the AR device 110 is held by the user if it is a mobile device or is mounted on a head of the user, and over both eyes of the user if it is an HMD. In some embodiments, the AR device 110 presents (e.g. via the AR module 212) the user with a view of the real world surrounding the user and digitally alters that view of the real world by, for example, adding virtual content (e.g., as in AR) or subtracting virtual content digitally from the real world view (e.g., as in diminished reality). When two or more AR devices 110 are in the same location and their respective cameras have overlapping fields of view, the MDAR registration system 100 automatically determines the pose (e.g., orientation and position) of each of the AR devices 110 in a common coordinate system using image information, and depth information if depth information is available, from each AR device 110. To determine the pose, each AR device 110 detects features in their field of view and those features are matched across devices 110 in order to map different devices to the same coordinate system as described below. With respect to the description below, an overlapping field of view occurs when two cameras 206 of the different AR devices 110 have at least one common image feature in their respective fields of view. The AR devices 110 are connected to the network 130 and may communicate with each other or with the server 120.

Figure 4A:
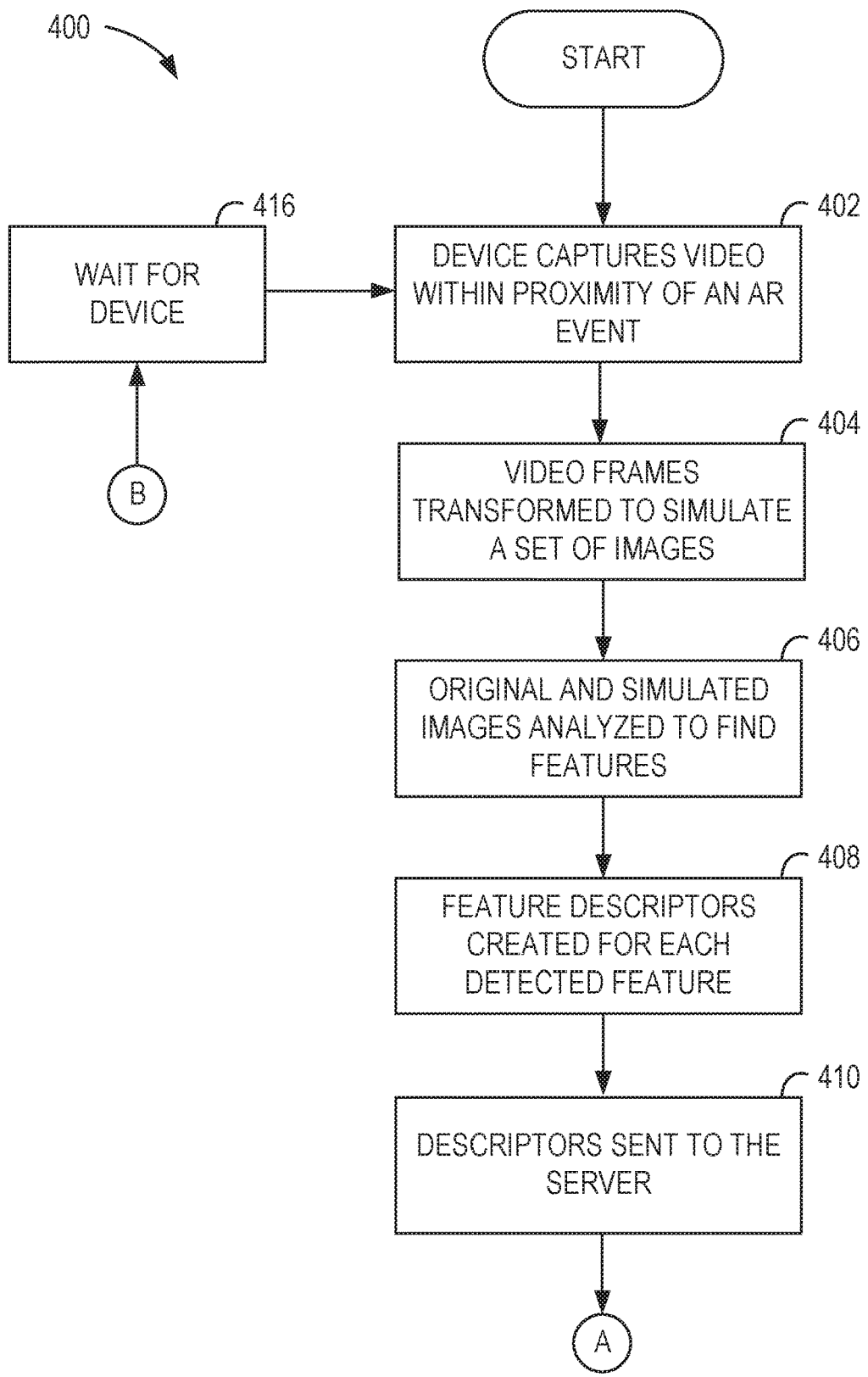
FIGS. 4A-4C illustrate a flow diagram for the method for registering and synchronizing the AR devices within the MDAR registration system.
Figure 4B:
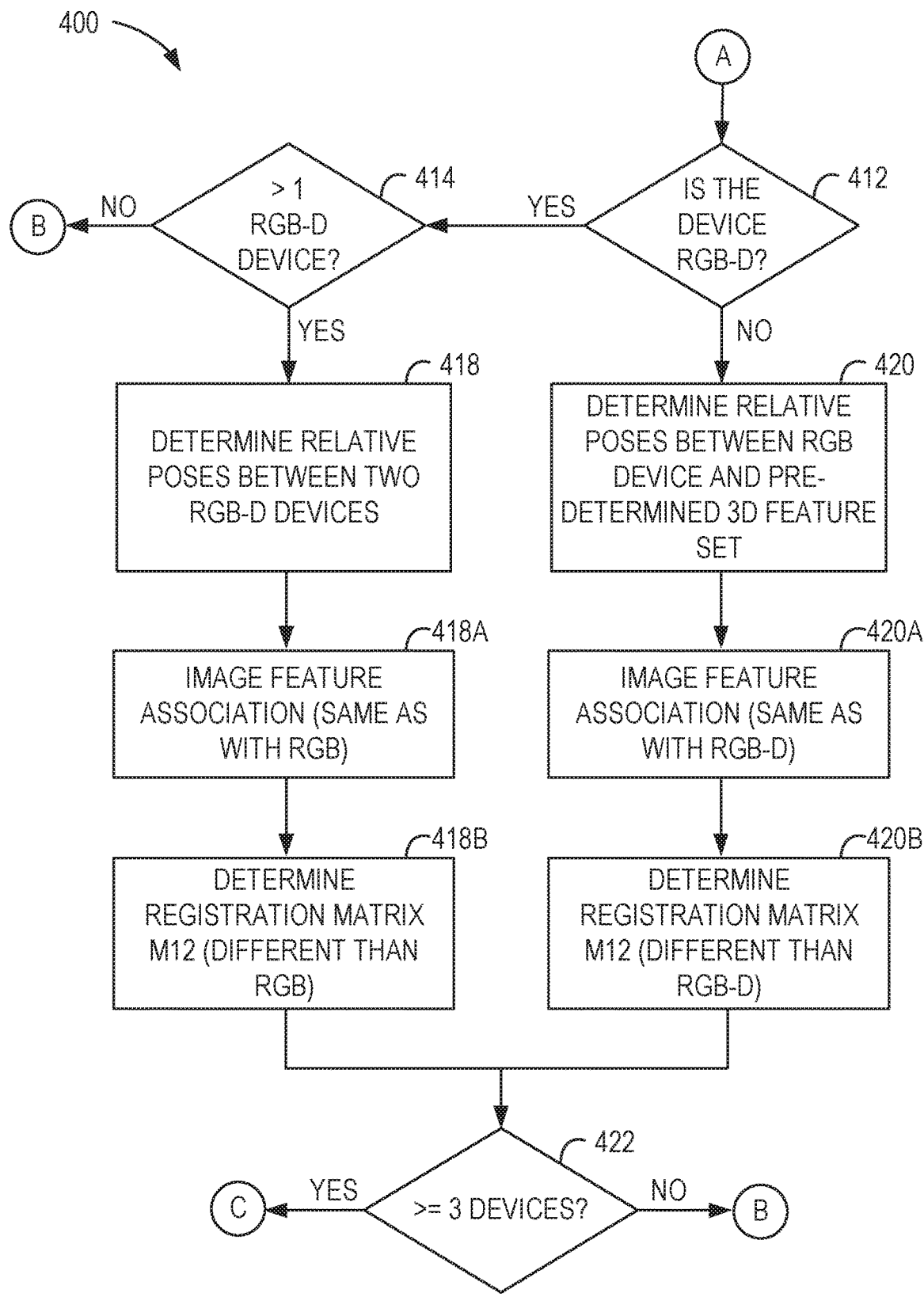
Figure 4C:
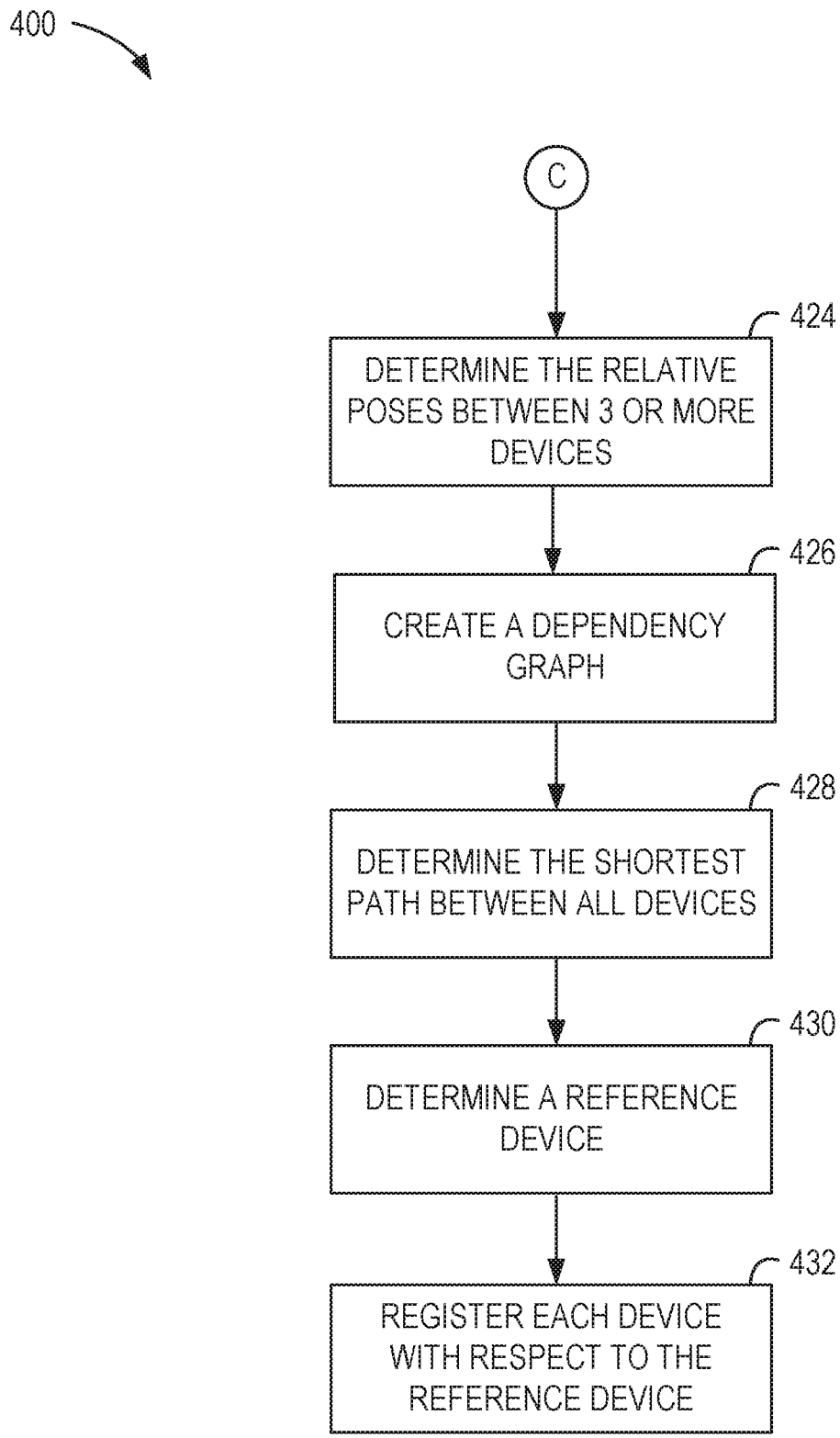

FIGS. 4A-4C illustrate a flow diagram for the method 400 for registering and synchronizing the AR devices 110 within the MDAR registration system 100. In the example embodiment, one or more of the AR devices 110 are operated by users at a real world location. The real world location has AR content and the users start their AR devices 110 in order to see the AR content via the AR device display 202. The AR content can be generated by one or more AR devices 110 near the location or by an independent source (e.g., a server device) near the location or remote from the location. As the user operates the AR device 110, the user moves the AR device 110 around the location with the device camera 206 on, capturing video of the real-world surroundings and including the AR content in the display for the user (see operation 402).

In the example embodiment, the multiple device registration module 210 analyzes the video data from the device camera 206. As described below, the analysis includes the detection of features within the video frames (see operation 406) and a calculation of descriptors for each detected feature (see operation 408). In some embodiments, the two steps of feature detection and creation of descriptors are performed on each AR device 110 locally. One purpose of detecting features is to match the detected features between two devices 110 in order to determine the relative pose between the two devices 110. One problem with matching the detected features from different devices 110 is that the devices are often looking at the same object features from very different points of view. Difference in points of view between the devices 110 can tend to create a large amount of parallax between the detected features, which may cause higher failure rates when using known feature matching algorithms.

To reduce the errors from parallax, in the example embodiment, the method 400 includes simulating (e.g., via mathematical transformations) a set of sample views of each original video frame by varying two camera axis orientation parameters (e.g., pan and tilt angles). Accordingly, a simulated set of images is generated for each video frame (see operation 404). The simulated set is created by taking each individual video frame and mathematically transforming it into a set of simulated images. Each video frame is transformed by simulating affine transformations for each value of the change of the camera optical axis orientation (i.e. the pan and tilt angles). The transformations are performed for a finite and small number of pan and tilt angles. Both angles are scanned simultaneously, so for each pan angle value, the tilt angle is varied over a pre-determined range. For example, the pan angle may be varied from −45 degrees to +45 degrees in increments of 10 degrees while the tilt angle may be varied from −70 degrees to +70 degrees in 10 degree increments. The example pan and tilt angles are given for ease of explanation and are not meant to be limiting in any way. Any angular range and increment can be used for either the pan or the tilt.

In the example embodiment, for each simulated image in a set, the multiple device registration module 210 analyzes the image to find 2D image features (see operation 406). To find the features, pixels in the image with high spatial frequency content are selected. With those pixels, the method 400 uses a known method to compute a scale and orientation invariant feature descriptor (see operation 408). This can include, for example, Oriented FAST and rotated BRIEF (ORB) feature description, or Scale-invariant feature transform (SIFT), or any other suitable method known to those in the art.

The multiple device registration module 210 then sends (e.g. over the network 130) the feature descriptors to the server 120 (see operation 410). As such, for each video frame, there is a set of simulated images (e.g., one simulated image for each pan and tilt angle). For each simulated image, including the original video frame, there are one or more detected features. And for each detected feature, there are one or more feature descriptors. The corresponding depth values (e.g., available with RGB-D devices) and pixel positions (e.g., the x and y position of the pixel in the image) of each feature are also transmitted along with the feature descriptors. The GPS position of the AR device 110 can also be transmitted to the server 120 in order to help the server 120 determine if two devices 110 are at the same location. The data transmitted to the server 120 for one AR device 110 is referred to herein as a feature set. The feature set can include feature descriptor data, depth value data, pixel position data, and GPS data.

In the example embodiment shown in FIG. 4B, the next step includes calculating the relative pose (e.g., position and orientation) between two AR devices 110. When at least two devices 110 with overlapping field of views have transmitted their respective feature sets to the server 120, the multiple device registration server module 322 estimates the relative pose between any pair of devices 110. The steps to determine the relative pose between two devices 110, in the example embodiment, differs based on whether the two devices are RGB devices 110 or whether they are RGB-D devices 110.

If, at test 412 of the example embodiment, the device is determined to be RGB-D, then it is determined at test 414 whether there is another RGB-D device at the same location with its own feature set. This may be determined by the multiple device registration server module 322 by, for example, checking the server 120 (or an associated database, not separately shown) for a feature set belonging to another RGB-D device 110, or by one device 110 directly detecting the presence of other nearby devices 110 (e.g., via Wi-Fi, Bluetooth, or other wireless networking). If there is no other RGB-D device present, then the multiple device registration server module 322 waits (e.g., postpones the calculation of the relative pose) order to allow another RGB-D device 110 to send a feature set to the server 120 (see operation 416).

If, at test 414 of the example embodiment, there are two or more RGB-D devices 110, then the multiple device registration server module 322 determines the relative pose between two RGB-D devices 110 (see operation 418). More specifically, the multiple device registration server module 322 performs a two-step process to determine the relative pose between two RGB-D devices at operation 418: an image feature association (see operation 418A) and determining a registration matrix specific to the two devices (see operation 418B). In some embodiments, the multiple device registration server module 322 generates feature points in 3D space for all pixels in a feature using the associated 2D image position combined with the depth value for each pixel. The feature points for a first RGB-D device (referred to in this example as "device 1" or "d1") are denoted as "f1", and the feature points for a second device (referred to in this example as "device 2" or "d2") are denoted as "f2". The output of operations 418, 418A, and 418B is a quantitative measure of the relative pose between the two feature sets (e.g., between the two devices that generated the two feature sets) and the quantitative measure can be represented by a matrix (referred to herein as a registration matrix) in the form of a transformation matrix, $M_{12}$, where R is a 3×3 rotation matrix and t is a 3×1 translation vector:

$$M_{12} = \begin{bmatrix} R_{11} & R_{12} & R_{13} & t_x \\ R_{21} & R_{22} & R_{23} & t_y \\ R_{31} & R_{32} & R_{33} & t_z \\ 0 & 0 & 0 & 1 \end{bmatrix}$$

The matrix $M_{12}$ denotes the relative pose of f2 with respect to f1 and is the rigid transformation from the coordinate system of device 2 to that of device 1. We refer herein to $M_{12}$ as a 3D registration matrix. Note that any format for calculating a relative pose between two camera coordinate systems can be used with the methods described herein without departing from the scope of the disclosure. For example the rotation may be described in terms of quaternions rather than the rotation matrix shown here. Note that the numbers '1' and '2' in $M_{12}$ can refer to any two AR devices and so there are many registration matrices. Further, there can be two matrices for each device pairing, one for a transformation from device 1 to device 2, referred to herein as $M_{21}$, and another for a transformation from device 2 to device 1, referred to herein as $M_{12}$. Given the form of matrix shown above, $M_{12}$ is the inverse matrix of $M_{21}$ and only one matrix of the pair $M_{21}$ and $M_{12}$ is calculated directly while the remaining matrix of the pair can be calculated by inverting the directly calculated matrix. To determine the registration matrix $M_{12}$ that maps f2 into f1, image feature descriptors (e.g., calculated during operation 408) are used in operation 418A to establish correspondence between features from f1 and features from f2 which allows the multiple device registration server module 322 to associate 3D points in the real world with the features that have correspondence.

Figure 5:
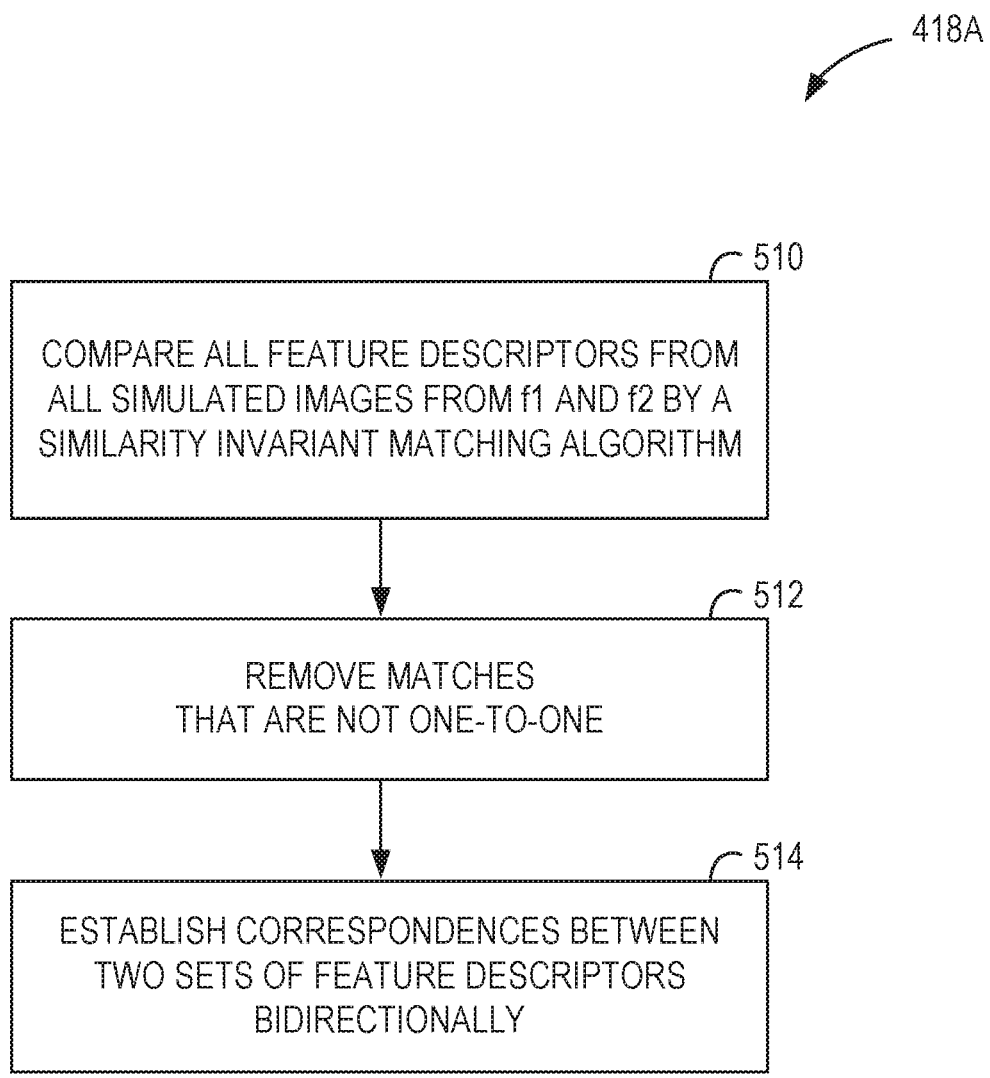
FIG. 5 illustrates an example embodiment of the image feature association of operation.

FIG. 5 illustrates an example embodiment of the image feature association of operation 418A. In the example embodiment, all feature descriptors from all simulated images from f1 and f2 are compared by a similarity invariant matching algorithm (see operation 510). In some embodiments, a brute force matching algorithm may be used, and a distance between the descriptors from f1 and f2 using the L2 norm (e.g., the vector norm) may be computed.

In some embodiments, operation 418A includes removing the matches that are not one-to-one (see operation 512). In other words, matches may be removed if a single feature in one feature set (e.g., f1) is matched with multiple features in another feature set (e.g., f2). Such removal may improve the matches. Further, in some embodiments, the correspondences between two sets of feature descriptors are established bidirectionally (see operation 514). One group of correspondences is generated from matching the first feature set, f1, to the second feature set, f2. A second group of correspondences is produced from matching the second feature set, f2, to the first feature set, f1. To accept a pair of matched features (e.g., a first feature from f1 and a second feature from f2), the two features in the pair are the closest matching candidate of each other in both directions. In other words, the first feature from f1 must be matched with highest correspondence to the second feature from f2 when running the correspondence of f1 with f2, and in addition, the second feature from f2 must be matched with highest correspondence to the first feature from f1 when running the correspondence of f2 with f1. Such an operation may increase the matching reliability and robustness against outliers.

Returning now to FIG. 4B, in the example embodiment, once operation 418A is completed, a filtering of outliers is performed using an error metric followed by the calculation of the registration matrix $M_{12}$ at operation 418B. In some embodiments, the multiple device registration server module 322 uses an iterative scheme with a geometric constraint wherein an error in projection of f2 to f1 using $M_{12}$ is minimized by solving for an $M_{12}$ that minimizes the error. In the iterative scheme, the error is used to refine the matched 3D points by dropping points that have too much error (e.g., with the error as described below). In some embodiments, to determine a registration matrix, $M_{12}$, between two feature sets f1 and f2, the following error metric is used:

$$E = \Sigma(|M_{12}*P2i - 1i|^2),$$

where P1i and P2i are the 3D points generated using the matched feature from f1 and f2 respectively.

The multiple device registration server module 322, in the example embodiment, solves for $M_{12}$ as a solution to a least square problem using the generalized inverse method along with an iterative scheme. At each iteration, only matched feature points with errors smaller than an average error are retained as good matches. The multiple device registration server module 322 computes the average error as:

$$\text{Average Error} = \frac{E}{\text{number of feature pairs}}.$$

If the error for feature i, $E_i = |M_{12}*P2i - P1i|^2$, is greater than the average error calculated above, the multiple device registration server module 322 rejects the feature as not agreeing with the registration matrix $M_{12}$. The iteration process stops once it reaches a maximum number of iterations or when the error is less than a pre-determined threshold.

The determined registration matrix, $M_{12}$, between the two matched feature sets f1 and f2 is then stored on the server 120 and represents the relative pose between the two corresponding devices, device 1 and device 2.

Returning to test 412, if the device is not an RGB-D device (e.g., if the device is an RGB device), the multiple device registration server module 322 calculates the relative pose for an RGB device with respect to an existing 3D feature set on the server (see operation 420 which includes operation 420A and 420B). In some embodiments, the 3D feature set (e.g., feature descriptors & associated 3D coordinates) is pre-existing, and is stored on the server 120 prior to the RGB device communicating with the server 120. The multiple device registration server module 322 associates feature descriptors from the RGB device with feature descriptors (and the associated 3D points) in the existing 3D feature set. In other words, the existing 3D feature set is used as a reference set of coordinates for the RGB device. The existing 3D feature set can be created in different ways. For example, the existing 3D feature set may be created using photogrammetry techniques, or by collection via an RGB-D device (e.g., using operations 402 to 410). As such, an RGB device can join an AR session at a location via a registration matrix when an RGB-D device is already in the session, or if a 3D feature set for the session (or the location) is already on the server.

During operation 420A, the multiple device registration server module 322, in the example embodiment, uses the same technique as described in operation 418A for image feature association in order to associate features from the RGB device with corresponding features in the pre-stored feature set. Further, the multiple device registration server module 322 calculates a registration matrix (see operation 420B). In the example embodiment, the module uses a geometric constraint described below to estimate the 3D registration matrix, $M_{12}$, between the RGB device and the server-stored 3D feature set. The output of operation 420A includes a set of 2D points from the RGB device (the set of 2D points including n points labeled from pc1 to pdn):

$$pd1(xd1, yd1),$$

$$pd2(xd2, yd2), \ldots$$

$$pdn(xdn, ydn),$$

which represent feature points with corresponding 3D world coordinates from the 3D feature set that existed on the server:

$$ps1(xs1, ys1, zs1),$$

$$ps2(xs2, ys2, zs2), \ldots$$

$$psn(xsn, ysn, zsn).$$

During operation 420B, to solve for the registration matrix $M_{12}$, the multiple device registration server module 322 creates a vector X={X1, X2, X3, X4, X5} and creates a matrix 'A' as follows:

$$A = \{\{yd1*xs1*yd1*ys1, -xd1*xs1, -xd1*ys1\},$$

$$\{yd2*xs2, yd2*ys2, -xd2*xs2, -xd2*ys2\}, \ldots$$

$$\{ydn*xsn, ydn*ysn, -xdn*xsn, -xdn*ysn\},$$

and a second vector:

$$B = \{xd1, xd2, xd3, \ldots, xdn\}.$$

The multiple device registration server module 322 then solves A*X=B in the Least Square sense using the generalized inverse method. In other words, the multiple device registration server module 322 calculates X=Ag*B where Ag=Transpose(A)*Inverse(A*Tanspose(A)), the Moore-Penrose pseudoinverse matrix.

The multiple device registration server module 322 then uses the solution vector X to find the x and y values (respectively referred to herein as $t_x$ and $t_y$) of the translation vector from $M_{12}$ as follows:

Let $S = X_1^2 + X_2^2 + X_4^2 + X_5^2$, then $$t_y = \sqrt{\frac{S - \sqrt{S*S - 4*(X_1*X_5 - X_4*X_2)^2}}{2*(X_1*X_5 - X_4*X_2)^2}},$$

and:

$$t_x = X_3 * t_y.$$

The multiple device registration server module 322 then computes the rotation matrix, R, for the registration matrix, $M_{12}$, as follows:

$R_{11} = X_1 * t_y,$ $R_{12} = X_2 * t_y,$ $R_{13} = \sqrt{1 - R_{11}*R_{11} - R_{12}*R_{12}},$ $R_{21} = X_4 * t_y,$ $R_{22} = X_5 * t_y,$ $R_{23} = \sqrt{1 - R_{21}*R_{21} - R_{22}*R_{22}},$ The multiple device registration server module 322 uses the outer product of the first two rows in R to generate the third row in R:

$R_{31} = R_{12}*R_{23} - R_{13}*R_{22},$ $R_{32} = R_{13}*R_{21} - R_{11}*R_{23},$ $R_{33} = R_{11}*R_{22} - R_{12}*R_{21},$

Finally, the multiple device registration server module 322 computes $t_z$ (the z value of the translation vector from $M_{12}$) by first creating another vector Y, where Y={Y1, Y2}. And then the multiple device registration server module 322 constructs the matrix C:

$C = \{\{R_{21}*xs1 + R_{22}*ys1 + t_y, yd1\},$ $\{R_{21}*xs2 + R_{22}*ys2 + t_y, yd2\}, \ldots,$ $\{R_{21}*xsn + R_{22}*ysn + t_y, ydn\}\},$ and the vector, D:

$D = \{yd1*(R_{31}*xs1 + R_{32}*ys1),$ $yd2*(R_{31}*xs2 + R_{32}*ys2), \ldots,$ $ydn*(R_{31}*xsn + R_{32}*ysn)\},$ The module solves C*Y=D in the Least Square sense using the generalized inverse method:

$Y = C_g * D,$ where:

$C_g = \text{Transpose}(C) * \text{Inverse}(C * \text{Transpose}(C))$ which allows the multiple device registration server module 322 to calculate the z component of the translation vector, $t_z = Y2$.

The values of the rotation matrix ($R_{11}$, $R_{12}$, $R_{13}$, $R_{21}$, $R_{27}$, $R_{23}$, $R_{31}$, $R_{32}$, and $R_{33}$) combined with the values of the translation matrix ($t_x$, $t_y$, and $t_z$) are used to populate the registration matrix for the RGB device and serves as the relative pose of the RGB device with respect to the reference 3D feature set. This registration matrix is recorded on the server 120, ending the operation 420B.

In the example embodiment, if, at test 422, there are 3 or more devices present and communicating with the server 120, then the multiple device registration server module 322 determines the relative pose between devices (see operation 424). Presume, for example, that there are 3 devices present and communicating with the server 120 (e.g., "device 1", "device 2", and "device 3"). If two pairs of these devices have recorded registration matrices on the server 120 (e.g., $M_{12}$ and $M_{23}$, using processes 418 and 420), then the multiple device registration server module 322 calculates a third registration matrix (e.g., $M_{13}$) that links the last pairing by using the two existing registration matrices, namely $M_{12}$ and $M_{23}$. If $M_{12}$ is the relative pose of device 2 with respect to device 1 and if the relative pose between device 3 and device 2 is $M_{23}$, then the relative pose between device 3 and device 1 is calculated using matrix multiplication of the individual matrices:

$M_{13} = M_{23} * M_{12},$

Using the formula above, a device's pose relative to another one can be calculated indirectly over an arbitrary number of intermediate device poses.

In the example embodiment, after finding the registration matrix $M_{ij}$ for every two feature sets (e.g., for every device combination present and communicating with the server 120 using the methods above for RGB-D devices in operations 418A and 418B and RGB devices in operations 420A and 420B and using the indirect method in operation 424 described in the previous paragraph), the multiple device registration module 322 builds a registration matrix array, where each element is $M_{ij}$, and represents the relative pose between device i and device j. In some embodiments, in this registration matrix array, an element can also represent a pre-stored 3D feature set as used to register RGB devices. For each registration matrix $M_{ij}$ in this array, the multiple device registration module 322 also calculates and stores a global residual error, $E_{ij}$, obtained by re-projecting the feature set fj onto the feature set fi:

$E_{ij} = \Sigma(|M_{ij}*Pjn - Pin|^2),$ where the sum is over n, the number of matched features for device i and device j, and where Pin and Pjn are the 3D points generated using the $n^{th}$ matched feature from fi and fj, respectively.

In the example embodiment, in order to determine a coordinate system to use as a common reference for all devices, the multiple device registration module 322 builds a dependency graph (see operation 426), which includes of a set of nodes representing the devices and a set of edges (e.g., links) that represent a connection between any two devices in the graph. The weight of each edge is the inverse of the error value ($1.0/E_{i,j}$) associated with the registration matrix $M_{ij}$ that connects the two nodes (e.g. node 'i' and node 'j').

With the dependency graph, in the example embodiment, estimating a device pose relative to a second device becomes a problem of finding the shortest path between the 2 associated nodes in the dependency graph. The multiple device registration module 322 finds the shortest path for all pairs of devices in the graph (e.g., using the classical Floyd-Warshall shortest path algorithm) (see operation 428).

In the example embodiment, after finding the shortest path, one device is selected as a reference device and all other devices are made to register their pose relative to the reference device coordinate system (see operation 430). In some embodiments, any device may be the reference device. In some embodiments, the reference device may be selected in order to minimize registration errors (e.g., minimize $E_{ij}$). In some embodiments, the reference device is selected as being the device 110 which has the smallest total weight on the shortest path to all the other devices 110.

After selecting a reference device, in the example embodiment, the multiple device registration module 322 then registers each device with respect to the reference device (see operation 432). In some embodiments, as part of the registration of a device with the reference device, the multiple device registration module 322 sends back to the device 110 (e.g., to the multiple device registration module 210 within the device) the coordinate system information for the reference device which includes the registration matrix between the device and the reference device (e.g., allowing a coordinate system transformation between the devices) After registration, all devices 110 are connected to a common coordinate system through their registration transform to the reference device. As such, all of the devices are thereby 'registered' and can operate their rendering in real-time in a common coordinate system.

Figure 6:
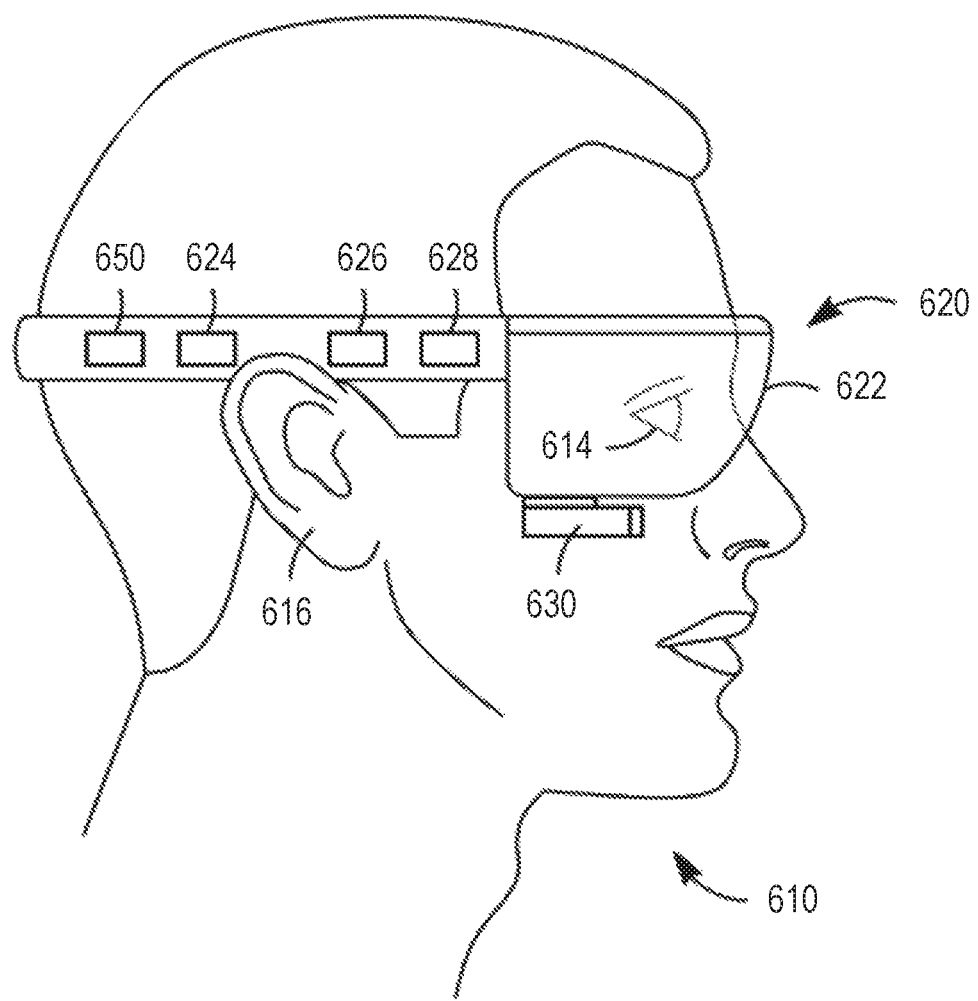
FIG. 6 is a diagram of an example head-mounted display (HMD), worn by a user.

FIG. 6 is a diagram of an example head-mounted display (HMD) 620, worn by a user (or "wearer") 610. In some embodiments, the HMD 620 is similar to the AR device 110 or the AR device 200, and may include any or all of the components of such devices 110, 200, though not all are separately identified in FIG. 6. In the example embodiment, the HMD device 620 includes a transparent or semi-transparent visor (or "lens", or "lenses") 622 through which the wearer 610 views their surroundings (also herein referred to also as "the real world"). In other embodiments, the MID device 620 may include an opaque visor 622 which may obscure the wearer 610's view of the real world, but may present the wearer 610 a view of their surroundings via input from a digital camera device 630.

In the example embodiment, the HMD 620 also includes a display device 628 that renders graphics (e.g., virtual objects) onto the visor 622. As such, the visor 622 acts as a "screen" or surface on which the output of the display device 628 appears, and through which the wearer 610 experiences virtual content. The display device 628 is driven or controlled by one or more GPUs 626 or HPUs. The GPU 626 processes aspects of graphical output that assists in speeding up rendering of output through the display device 628. In some embodiments, the visor 622 and display processor 628 may be similar to the display device 202 and the GPU 222 or HPU 224.

In the example embodiment, the HMD device 620 also includes a central processor 624 that may execute some of the operations and methods described herein (e.g., executing the multiple device registration module 210 or the multiple device registration server module 322). The MID device 620 also includes an audio device 650 that is configured to present audio output to the wearer 610 (e.g., via ears 616). While not separately shown, the HMD device 620 also includes a network device similar to the networking device 204, and may communicate with the server 120 during operation.

In some embodiments, the HMD device 620 includes the digital camera device 630. The digital camera device (or just "camera") 630 is a forward-facing video input device that is oriented so as to cover at least a portion of a field of view (FOV) of the wearer 610. In other words, the camera 630 captures or "sees" an angle of view of the real world based on the orientation of the HMD device 620 (e.g., similar to what the wearer 610 sees in the wearer 610's FOV when looking through the visor 622). The digital video from the camera device 630 may be analyzed to detect various features of objects near the wearer 610, or determining distance to those objects as part of the method 400 described with respect to FIG. 4A, FIG. 4B, FIG. 4C and FIG. 5. In some embodiments, output from the digital camera device 630 may be projected onto the visor 622 (e.g., in opaque visor embodiments), and may also include additional virtual content (e.g., added to the camera output).

In some embodiments, the HMD device 620 may include one or more sensors (not separately shown in FIG. 6), or may be coupled in wired or wireless communication with the sensors (e.g., near-field communication (NFC) with a wrist-wearable device also worn by the wearer 610). For example, the HMD 620 may include motion or position sensors configured to determine a position or orientation of the HMD 620.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-5 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the systems and methods described herein in different contexts from this disclosure.

Figure 7:
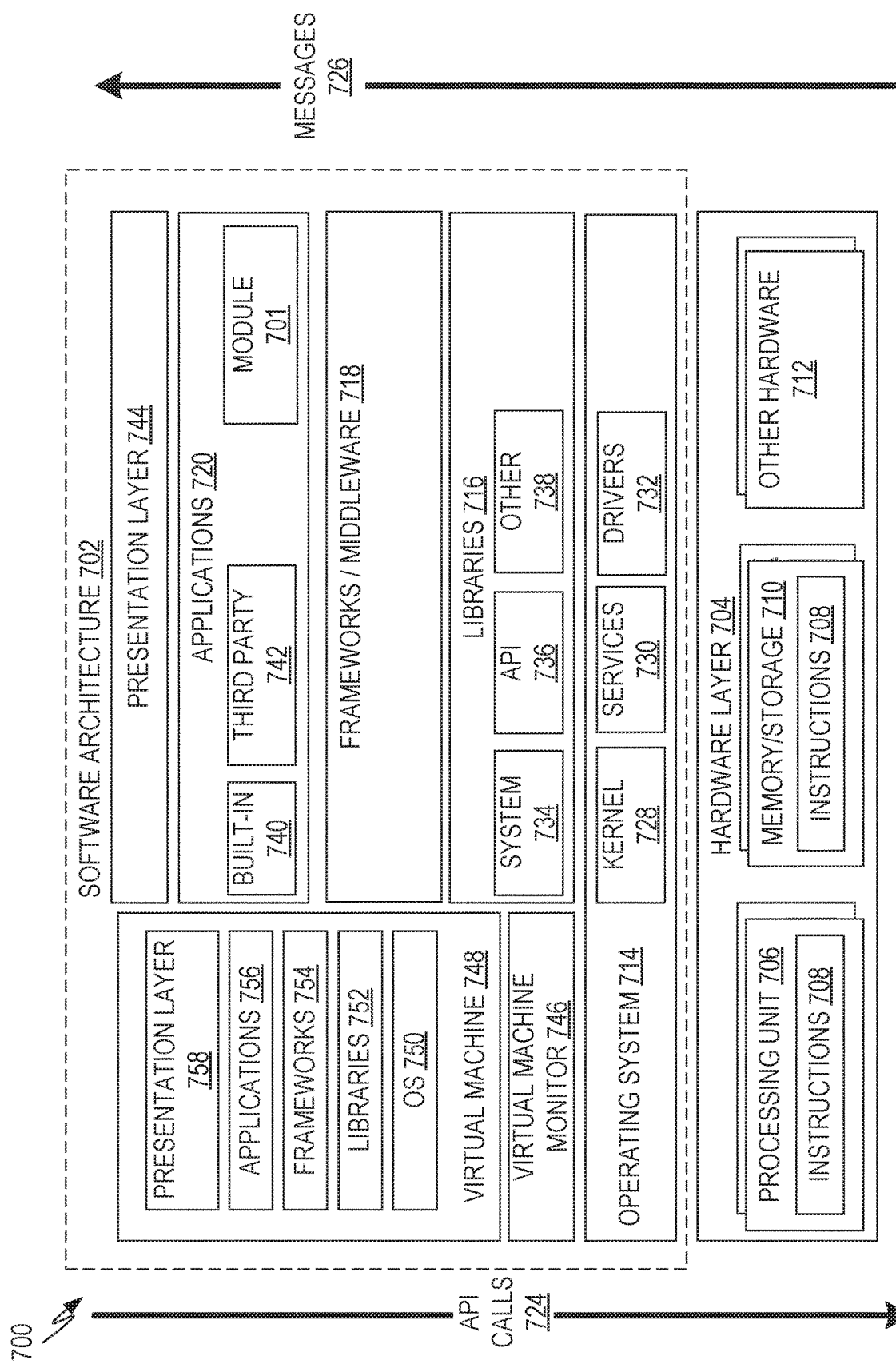
FIG. 7 is a block diagram illustrating a representative software architecture, which may be used in conjunction with various hardware architectures described herein.

FIG. 7 is a block diagram 700 illustrating a representative software architecture 702, which may be used in conjunction with various hardware architectures described herein to provide the VR tools and development environment described herein. FIG. 7 is merely a non-limiting example of a software architecture and it will be appreciated that many other architectures may be implemented to facilitate the functionality described herein. The software architecture 702 may be executing on hardware such as machine 800 of FIG. 8 that includes, among other things, processors 810, memory 830, and I/O components 850. A representative hardware layer 704 is illustrated and can represent, for example, the machine 800 of FIG. 8. The representative hardware layer 704 comprises one or more processing units 706 having associated executable instructions 708. Executable instructions 708 represent the executable instructions of the software architecture 702, including implementation of the methods, modules and so forth of FIGS. 1-5. Hardware layer 704 also includes memory or storage modules 710, which also have executable instructions 708. Hardware layer 704 may also comprise other hardware as indicated by 712 which represents any other hardware of the hardware layer 704, such as the other hardware illustrated as part of machine 800.

In the example architecture of FIG. 7, the software 702 may be conceptualized as a stack of layers where each layer provides particular functionality. For example, the software 702 may include layers such as an operating system 714, libraries 716, frameworks/middleware 718, applications 720 and presentation layer 722. Operationally, the applications 720 or other components within the layers may invoke application programming interface (API) calls 724 through the software stack and receive a response, returned values, and so forth illustrated as messages 726 in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be utilized by the applications 720 or other components or layers. The libraries 716 typically provide functionality that allows other software modules to perform tasks in an easier fashion than to interface directly with the underlying operating system 714 functionality (e.g., kernel 728, services 730 or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 or other software components/modules. For example, the frameworks 718 may provide various graphic user interface ((UI) functions, high-level resource management, high-level location services, and so forth. The frameworks 718 may provide a broad spectrum of other APIs that may be utilized by the applications 720 or other software components/modules, some of which may be specific to a particular operating system or platform.

The applications 720 includes built-in applications 740 or third party applications 742. Examples of representative built-in applications 740 may include, but are not limited to, a contacts application, a browser application, a book reader application, a location application, a media application, a messaging application, a VR engine, or a game application. Third party applications 742 may include any of the built in applications as well as a broad assortment of other applications. In a specific example, the third party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 742 may invoke the API calls 724 provided by the mobile operating system such as operating system 714 to facilitate functionality described herein.

The applications 720 may utilize built in operating system functions (e.g., kernel 728, services 730 or drivers 732), libraries (e.g., system 734, APIs 736, and other libraries 738), frameworks/middleware 718 to create user interfaces to interact with users of the system. Alternatively, or additionally, in some systems interactions with a user may occur through a presentation layer, such as presentation layer 744.

In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware machine (such as the machine of FIG. 8, for example). A virtual machine is hosted by a host operating system (operating system 714 in FIG. 7) and typically, although not always, has a virtual machine monitor 746, which manages the operation of the virtual machine as well as the interface with the host operating system (i.e., operating system 714). A software architecture executes within the virtual machine such as an operating system 750, libraries 752, frameworks/middleware 754, applications 756 or presentation layer 758. These layers of software architecture executing within the virtual machine 748 can be the same as corresponding layers previously described or may be different.

Figure 8:
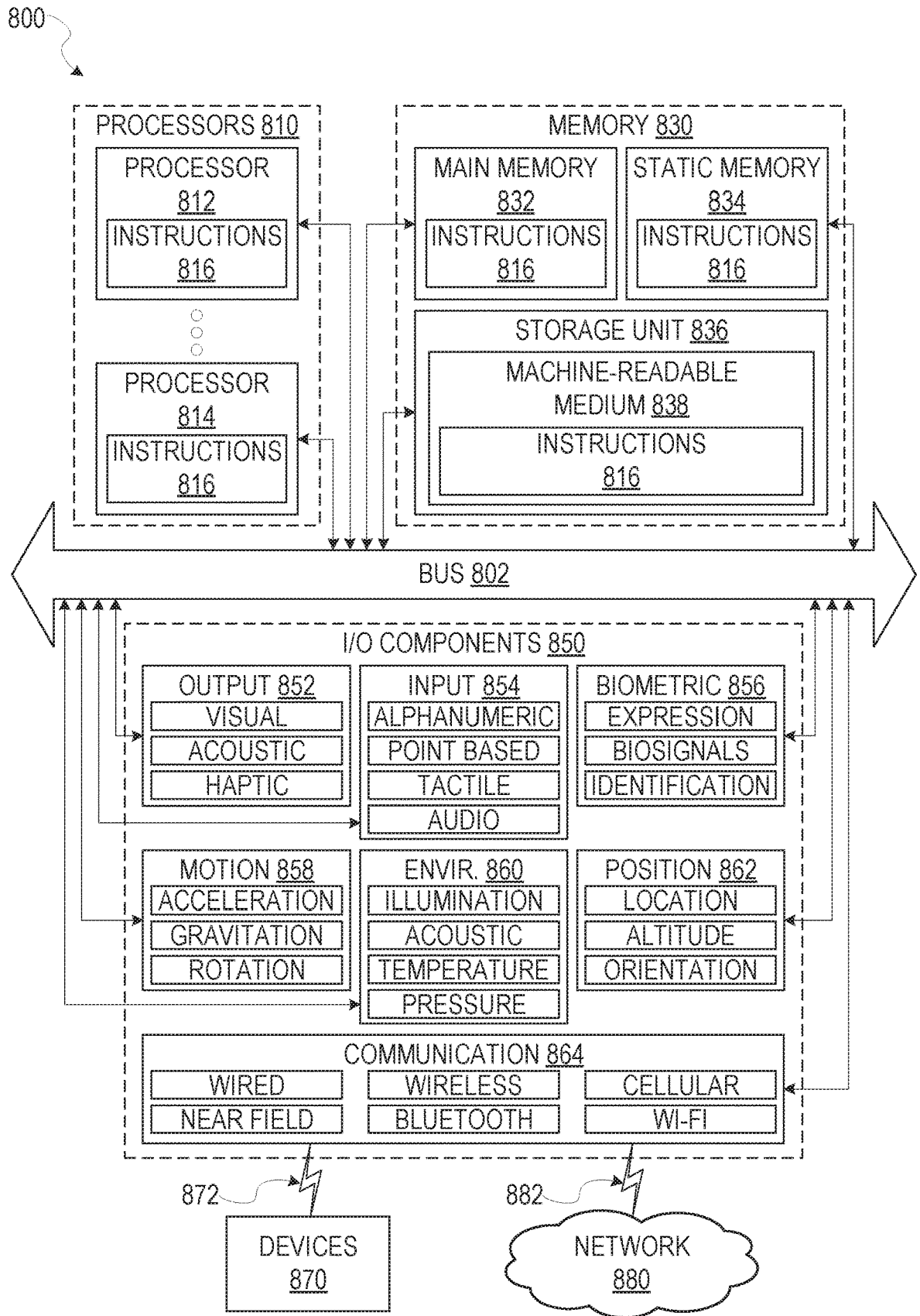
FIG. 8 is a block diagram illustrating components of a machine, according to some example embodiments, able to read instructions from a machine-readable medium (e.g., a machine-readable storage medium) and perform any one or more of the VR methodologies discussed herein.

FIG. 8 is a block diagram illustrating components of a machine 800, according to some example embodiments, able to read instructions from a machine-readable medium 838 (e.g., a machine-readable storage medium) and perform any one or more of the VR methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example the instructions may cause the machine to execute the flow diagrams of FIGS. 4A-5. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 812 and processor 814 that may execute instructions 816. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core process), multiple processors with a single core, multiple processors with multiples cores, or any combination thereof.

The memory/storage 830 may include a memory 832, such as a main memory, or other memory storage, and a storage unit 1536, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 1536, and the memory of processors 810 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., displays such as a plasma display panel (PDP), a light emitting diode (LED) display, a liquid crystal display (LCD), a projector, a cathode ray tube (CRT), or wearable devices such as head-mounted display (HMD) devices), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), motion-sensing input components (e.g., hand controllers), audio input components (e.g., a microphone), and the like.

In further example embodiments, the I/O components 850 may include biometric components 856, motion components 858, environmental components 860, or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), position-sensing components, and so forth. The environmental components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872 respectively. For example, the communication components 864 may include a network interface component or other suitable device to interface with the network 880. In further examples, communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (MAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LIE) standard, others defined by various standard setting organizations, other long range protocols, or other data transfer technology.

The instructions 816 may be transmitted or received over the network 880 using a transmission medium via a network interface device e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to devices 870. The term "transmission medium" shall be taken to include any intangible medium that is capable of storing, encoding, or carrying instructions 816 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense,

The invention claimed is:

1. A system comprising:
   a mobile device with one or more hardware processors, a mobile-device memory, and a digital camera device configured to capture digital video; and
   a multiple device registration module in the mobile-device memory the multiple device registration module configuring the one or more hardware processors to perform operations comprising:
   receiving the digital video from the digital camera device, the digital video presenting a 2D view of a three-dimensional environment surrounding the mobile device;
   generating a set of simulated images based on each video frame in the digital video, wherein each simulated image in the set is generated by performing a transformation of the video frame using a plurality of pan and tilt angles;
   analyzing the simulated images and video frame to determine features and create scale and orientation invariant descriptors that include depth information for the features;
   sending the descriptors and other data to a server over a network for determining a registration matrix specific to the mobile device and additional devices, the determining including: computing registration matrices between combinations of mobile devices from within a plurality of mobile devices, the plurality of mobile devices including the mobile device and the additional devices;
   building a dependency graph wherein each node of the graph represents one mobile device from the plurality of mobile devices, and a connection between two nodes represents a registration matrix between two devices represented by each of the two nodes and includes a residual error of an accuracy of the registration matrix;

determining a shortest path between nodes in the graph;

determining a single reference device from the plurality of mobile devices in the graph, wherein the reference device is chosen to have a smallest total weight on the shortest path to other devices in the graph;

determining additional registration matrices for the plurality of mobile devices in the graph relative to the reference device;

sending the additional registration matrices to the plurality of mobile devices via the network; and based on a receiving of a registration matrix from the server, using the registration matrix to transform a coordinate system of the mobile device into a coordinate system that is common to the mobile device and the additional devices.

2. The system of claim 1, wherein the mobile device is configured to display virtual objects to a user and is selected from the group consisting of a head mounted display (HMD) and mobile cellular device.

3. The system of claim 1, wherein the transformation is an affine transformation.

4. The system of claim 1, wherein the depth information is not available and the determining of the registration matrix includes using a geometric constraint to estimate the registration matrix between the mobile device and a previously stored set of descriptors.

5. The system of claim 1, wherein the other data includes mobile device location data, and wherein computing the registration matrices is restricted to mobile devices determined to be within a proximity threshold of each other.

6. The system of claim 1, wherein matching the feature descriptors includes removing matches that are not one-to-one matches and removing matches that are not bi-directional matches.

7. The system of claim 1, wherein the determining of the registration matrix includes solving for a matrix that minimizes an error in projecting 3D points associated with features from the mobile device onto corresponding 3D points associated with features from the second mobile device.

8. The system of claim 1, wherein determining the additional registration matrix for the additional mobile device uses matrix multiplication of registration matrices along a path in the graph from the reference device to the mobile device.

9. A computer-implemented method comprising:

receiving a digital video from a digital camera device, the digital video presenting a 2D view of a three-dimensional environment surrounding the mobile device;

generating a set of simulated images based on each video frame in the digital video, wherein each simulated image in the set is generated by performing a transformation of the video frame using a plurality of pan and tilt angles;

analyzing the simulated images and video frame to determine features and create scale and orientation invariant descriptors that include depth information for the features;

sending the descriptors and other data to a server over a network for determining a registration matrix specific to the mobile device and additional devices, the determining including: computing registration matrices between combinations of mobile devices from within a plurality of mobile devices, the plurality of mobile devices including the mobile device and the additional devices;

building a dependency graph wherein each node of the graph represents one mobile device from the plurality of mobile devices, and a connection between two nodes represents a registration matrix between two devices represented by each of the two nodes and includes a residual error of an accuracy of the registration matrix;

determining a shortest path between nodes in the graph;

determining a single reference device from the plurality of mobile devices in the graph, wherein the reference device is chosen to have a smallest total weight on the shortest path to other devices in the graph;

determining additional registration matrices for the plurality of mobile devices in the graph relative to the reference device;

sending the additional registration matrices to the plurality of mobile devices via the network;

based on a receiving of a registration matrix from the server, using the registration matrix to transform a coordinate system of the mobile device into a coordinate system that is common to the mobile device and the additional devices.

10. The computer-implemented method of claim 9, wherein the mobile device is configured to display virtual objects to a user and is selected from the group consisting of a head mounted display (HMD) and mobile cellular device.

11. The computer-implemented method of claim 9, wherein the transformation is an affine transformation.

12. The computer-implemented method of claim 9, wherein the depth information is not available and the determining of the registration matrix includes using a geometric constraint to estimate the registration matrix between the mobile device and a previously stored set of descriptors.

13. The computer-implemented method of claim 9, wherein the other data includes mobile device location data, and wherein computing the registration matrices is restricted to mobile devices determined to be within a proximity threshold of each other.

14. The computer-implemented method of claim 9, wherein matching the feature descriptors includes removing matches that are not one-to-one matches and removing matches that are not bi-directional matches.

15. A non-transitory computer-readable medium comprising a set of instructions that, when executed by one or more computer processors, causes the one or more computer processors to perform operations comprising:

receiving a digital video from a digital camera device, the digital video presenting a 2D view of a three-dimensional environment surrounding the mobile device;

generating a set of simulated images based on each video frame in the digital video, wherein each simulated image in the set is generated by performing a transformation of the video frame using a plurality of pan and tilt angles;

analyzing the simulated images and video frame to determine features and create scale and orientation invariant descriptors that include depth information for the features;

sending the descriptors and other data to a server over a network for determining a registration matrix specific to the mobile device and additional devices, the determining including: computing registration matrices between combinations of mobile devices from within a plurality of mobile devices, the plurality of mobile devices including the mobile device and the additional devices;

building a dependency graph wherein each node of the graph represents one mobile device from the plurality of mobile devices, and a connection between two nodes represents a registration matrix between two devices represented by each of the two nodes and includes a residual error of an accuracy of the registration matrix;

determining a shortest path between nodes in the graph;

determining a single reference device from the plurality of mobile devices in the graph, wherein the reference device is chosen to have a smallest total weight on the shortest path to other devices in the graph;

determining additional registration matrices for the plurality of mobile devices in the graph relative to the reference device;

sending the additional registration matrices to the plurality of mobile devices via the network;

based on a receiving of a registration matrix from the server, using the registration matrix to transform a coordinate system of the mobile device into a coordinate system that is common to the mobile device and the additional devices.

16. The non-transitory computer-readable medium of claim 15, wherein the mobile device is configured to display virtual objects to a user and is selected from the group consisting of a head mounted display (HMD) and mobile cellular device.

17. The non-transitory computer-readable medium of claim 15, wherein the transformation is an affine transformation.

18. The non-transitory computer-readable medium of claim 15, wherein the depth information is not available and the determining of the registration matrix includes using a geometric constraint to estimate the registration matrix between the mobile device and a previously stored set of descriptors.

19. The non-transitory computer-readable medium of claim 15, wherein the other data includes mobile device location data, and wherein computing the registration matrices is restricted to mobile devices determined to be within a proximity threshold of each other.

* * * * *